(12) United States Patent
Swadling

(10) Patent No.: US 7,073,725 B2
(45) Date of Patent: Jul. 11, 2006

(54) FLOW MIXER

(75) Inventor: Jeremy Philip Swadling, Rowlands Castle (GB)

(73) Assignee: Valquest Limited, Rowlands Castle (GB)

( * ) Notice: Subject to any disclaimer, the term of this patent is extended or adjusted under 35 U.S.C. 154(b) by 0 days.

(21) Appl. No.: 10/433,744

(22) PCT Filed: Dec. 3, 2001

(86) PCT No.: PCT/GB01/05342

§ 371 (c)(1),
(2), (4) Date: Jun. 6, 2003

(87) PCT Pub. No.: WO02/46853

PCT Pub. Date: Jun. 13, 2002

(65) Prior Publication Data

US 2004/0046037 A1    Mar. 11, 2004

Related U.S. Application Data

(60) Provisional application No. 60/264,602, filed on Jan. 26, 2001.

(30) Foreign Application Priority Data

Dec. 6, 2000 (GB) ................................ 0029714.3

(51) Int. Cl.
*G05D 23/13* (2006.01)
(52) U.S. Cl. .................................................. 236/12.2
(58) Field of Classification Search ................ 236/12.2
See application file for complete search history.

(56) References Cited

U.S. PATENT DOCUMENTS

| 3,827,016 | A | * | 7/1974 | Knapp | 236/12.2 |
| 4,029,256 | A | * | 6/1977 | Dauga | 236/12.2 |
| 5,148,976 | A | * | 9/1992 | Reid | 236/12.2 |
| 5,379,936 | A | * | 1/1995 | Kline | 236/12.2 |
| 6,079,625 | A | * | 6/2000 | Lebkuchner | 236/12.2 |
| 6,250,559 | B1 | * | 6/2001 | Knauss | 236/12.2 |
| 6,454,175 | B1 | * | 9/2002 | Lorch | 236/12.2 |
| 6,517,006 | B1 | * | 2/2003 | Knapp | 236/12.2 |
| 6,557,770 | B1 | * | 5/2003 | Mace et al. | 236/12.1 |
| 6,585,167 | B1 | * | 7/2003 | Wolber et al. | 236/12.2 |
| 6,732,937 | B1 | * | 5/2004 | Graves | 236/12.2 |

FOREIGN PATENT DOCUMENTS

EP    0566433    10/1993

(Continued)

*Primary Examiner*—William E. Tapolcai
(74) *Attorney, Agent, or Firm*—Ware, Fressola, Van Der Sluys & Adolphson LLP

(57) ABSTRACT

A mixer tap for a shower has a body 1, with a cold water pipe connection 2, a hot water pipe connection 3 and a mixed water outlet connection 4. A flow control knob 5 and a water temperature control knob 6 are provided at the front of the tap. The tap has a flow mixer cartridge 11, which is sealed in a cavity 12 in the body. The collar has three sealing grooves 15,16,17 carrying O-rings 115,116,117. To one side, of the oblique groove 16, the collar has a cold water port 22; whilst to the other side it has a hot water port 23. These ports are in communication with the cold and hot water connections 2,3 in the body. The connections are able to be axially aligned with each other, since the ports 22,23 are offset and isolated from each other by the oblique seal.

35 Claims, 5 Drawing Sheets

FOREIGN PATENT DOCUMENTS

| | | |
|---|---|---|
| EP | 0694721 | 1/1996 |
| WO | 0068754 | 11/2000 |

* cited by examiner

FLOW MIXER

CROSS REFERENCE TO RELATED APPLICATIONS

This application is for entry into the U.S. national phase under §371 for International Application No. PCT/GB01/05342 having an international filing date of Dec. 3, 2001, and from which priority is claimed under all applicable sections of Title 35 of the United States Code including, but not limited to, Sections 120, 363 and 365(c), and which in turn claims the benefit to U.S. Provisional Patent Application No. 60/264,602 filed on Jan. 26, 2001 and Great Britain Patent Application No. 0029714.3 filed on Dec. 6, 2000.

TECHNICAL FIELD

The present invention relates to a cartridge for a flow mixer and a mixer for two liquid flows at different temperatures, particularly though not exclusively for thermostatic mixing of water in a shower.

BACKGROUND OF THE INVENTION

It is known to employ a thermostatic capsule to move a shuttle to open or close small gaps on either side of the shuttle. It is convenient for this shuttle to be circular with the gaps being annular, but this gives rise to other problems.

The inlet to the annular gaps is conveniently radially inwards, with mixed flow then passing axially to the thermostatic capsule. This arrangement calls for flow regulation downstream of the capsule and on the side of the capsule opposite from flow and temperature controls. Conventionally, the flow control has been carried out by means of a member spaced radially outwards of the shuttle. This mitigates against a compact structure.

SUMMARY OF THE INVENTION

The object of the invention is to provide an arrangement wherein a flow control member passes inwardly of the shuttle to provide a more compact structure. A secondary object is to provide a more compact inlet flow arrangement.

According to the invention there is provided a cartridge for a flow mixer comprising:
  a barrel having:
    an outlet at one end of the barrel,
    two aligned barrel portions and
    a intermediate barrel portion and
    the barrel portions providing:
  two respective liquid inlets spaced along the barrel, one to one side of the intermediate barrel portion and the other to the other side thereof, and
  a shuttle mounted in the barrel in sealing relationship with the intermediate barrel portion and axially movable in the barrel, the shuttle and the barrel being adapted and arranged to:
    close one of the inlets by co-operation with the inlet's respective barrel portion and the intermediate barrel portion when moved towards this barrel portion;
    close the other inlet by co-operation with its respective barrel portion and the intermediate portion when moved in the other direction and
    allow both inlets to be open in a mid position, and
    the shuttle being apertured for flow therethrough,
  a thermostatic capsule arranged within the barrel in the flow of liquid through the inlets and adapted to control the position of the shuttle for selection of flow from the two inlets,
  a combined-flow control member ("flow controller") arranged downstream of the thermostatic capsule at the outlet end of the barrel for controlling the combined flow from the inlets and
  means including at least one finger passing through the shuttle for actuating the flow controller to control the combined flow.

Whilst it can be envisaged that the flow controller can have various forms, such as a movable obturator closing an open end of the barrel forming the outlet or an apertured cylinder closing one or more outlet apertures in the barrel at the outlet end with the end being closed; in the preferred embodiment, the flow controller is a sleeve mounted in the barrel and sealing in its closed position against a closed end of the barrel, thereby closing an outlet aperture in the wall of the barrel adjacent its end. Preferably, the flow control sleeve seals against a seal captivated between the sleeve and the end of the barrel.

Where the shuttle is contained completely within the barrel, the latter can be envisaged to be of unitary construction with the inlets being apertures in the aligned portions. However, as in the preferred embodiment, the two aligned barrel portions are distinct parts which are sealed together, with the intermediate barrel portion being integrally connected to one of the two barrel portions, with the shuttle acting between opposed ends of the two portions.

The actuating means for the flow controller can be an integral part of the flow controller, such as one or more fingers integrally moulded with the flow controller and engaging an actuator at the opposite side of the shuttle from the flow controller and the thermostatic capsule, or it can be one or more fingers extending integrally extending from the actuator and engaging the flow controller. It can also be envisaged that the actuating means can be separately formed and engaged with both the flow controller and the actuator.

The actuator is conveniently a sleeve splined or otherwise irrotationally held in the barrel and a rotary member carried by the barrel, the sleeve and the rotary member being adapted to convert rotation of the rotary member into translation of the actuator and the flow controller. Whilst its conceivable that the actuator could be sealed to the barrel and to the rotary member at the rotary motion converter, a more practical arrangement is to seal the barrel to the rotary member which will usually extend inside the actuator.

A similar rotary to translational movement arrangement for effecting temperature regulation with the thermostatic capsule is preferably provided within the flow control actuator/rotary-member assembly.

Preferably the cartridge is of moulded plastics components, with the exception of the thermostatic capsule, associated springs, seals and other fittings.

In one embodiment, the shuttle has an O-ring carried on a rim of the shuttle and acting with the intermediate barrel portion to provide the seal between the shuttle and the intermediate barrel portion.

In another embodiment the shuttle has an over-moulding of elastomeric material on a rim of the shuttle, the over-moulding having a sealing protrusion acting with the intermediate barrel portion to provide the seal between the shuttle and/or the intermediate barrel portion and annular portions at sealing faces adapted to co-operate with the aligned barrel portions to close the respective inlets.

In respect of the secondary object, it is generally inconvenient to provide stepped water ways for hot and cold water in the body of a tap receiving a mixer cartridge. Nevertheless, since aesthetics can require that externally the water ways should be co-axial, stepped water ways are often provided. Where, as is usual, the body is of brass, this mitigates against stampings in favour of castings despite stampings being cheaper.

In accordance with an important preferred feature of the invention, the cartridge includes three outer seals encircling the axis of the barrel for sealing to an outer body, the seals comprising:
- a back seal for sealing the outlet of the barrel from the inlet closer to the outlet;
- a front seal for sealing the inlet further from the outlet from leaking to ambient; and
- an oblique seal for sealing the inlet closer to the outlet from the inlet further from the outlet, the oblique seal being spaced further from the back seal to one side of the barrel and spaced further from the front seal to the other side of the barrel.

The oblique seal allows opposed waterways to the cartridge to be coaxial. Preferably, the seals are arranged to seal with a conical bore. Conveniently the seals are O-rings carried in respective grooves on the outer surface of the cartridge.

In accordance with another important feature of the invention, the barrel has an outer collar integrally connected with the aligned barrel portion having the outlet, the collar having:
- a first inlet between the back seal and the oblique seal to one side of the barrel and
- a second inlet between the front seal and the oblique seal to the other side of the barrel, and
- the first and second collar inlets communicating with the barrels inlets.

Whilst it can be envisaged that the outer collar can be separate and sealed to the barrel or one of its parts, in the preferred embodiment, the outer collar is integral with one part of the barrel. Preferably, the collar inlets communicate with the barrel inlets via plenum chambers extending around the barrel.

According to another aspect of the invention, there is provided A cartridge for a flow mixer comprising:
- a barrel having:
  - an outlet at one end of the barrel,
  - two aligned barrel portions and
  - a intermediate barrel portion and
  - the barrel portions providing:
  - two respective liquid inlets spaced along the barrel, one to one side of the intermediate barrel portion and the other to the other side thereof, and
- a shuttle mounted in the barrel in sealing relationship with the intermediate barrel portion and axially movable in the barrel, the shuttle and the barrel being adapted and arranged to:
  - close one of the inlets by co-operation with the inlet's respective barrel portion and the intermediate barrel portion when moved towards this barrel portion;
  - close the other inlet by co-operation with its respective barrel portion and the intermediate portion when moved in the other direction and
  - allow to be open in a mid position, and
  - the shuttle being apertured for flow therethrough,

- a thermostatic capsule arranged within the barrel in the flow of liquid through the inlets and adapted to control the position of the shuttle for selection of flow from the two inlets,
- a combined-flow control member ("flow controller") arranged downstream of the thermostatic capsule at the outlet end of the barrel for controlling the combined flow from the inlets and
- three outer seals encircling the axis of the barrel for sealing to an outer body, the seals comprising:
  - a back seal for sealing the outlet of the barrel from the inlet closer to the outlet;
  - a front seal for sealing the inlet further from the outlet from leaking to ambient; and
  - an oblique seal for sealing the inlet closer to the outlet from the inlet further from the outlet, the oblique seal being spaced further from the back seal to one side of the barrel and spaced further from the front seal to the other side of the barrel.

According to a third aspect of the invention there is provided a mixer tap for mixing two liquid flows, the tap comprising:
- an outer body, having a central cavity with
  - an open front,
  - a rear outlet from the central cavity and
  - two opposed inlets from the sides of the body, the inlets in the body being coaxial and the cavity being adapted for sealing; and
- a cartridge of the second aspect of the invention, the cartridge sealing with the body via the outer collar:
  - firstly at the open front of the central cavity,
  - secondly obliquely in the cavity to direct flow from one body inlet to one cartridge inlet and flow from the other body inlet to the other cartridge inlet,
  - thirdly at the rear of the body to direct flow from the cartridge outlet to the body rear.

Preferably the outer body is of forged brass.

Preferably the cavity is tapered with an larger diameter parallel land at the open front for the first seal, a frusto-conical, intermediate portion for the second, oblique seal and a smaller parallel land for the third seal adjacent the rear outlet, the seals being O-rings carried on the outer collar.

Normally the rear body outlet will be upwardly directed with respect to the tap orientation when a common plane of the central cavity and the two body inlets is horizontal.

According to a fourth aspect of the invention there is provided a shuttle for a flow mixer cartridge, the shuttle comprising a rim with two annular end faces for sealing with respective aligned barrel portions of the cartridge, the annular end faces being provided with an over-moulding of elastomeric material for sealing engagement with the respective aligned barrel portions.

Whilst the rim can have a groove for an O-ring arranged to seal to an intermediate barrel portion of the cartridge; preferably the over-moulding has a sealing protrusion arranged to seal to an intermediate barrel portion of the cartridge.

BRIEF DESCRIPTION OF THE DRAWINGS

To help understanding of the invention, a specific embodiment thereof will now be described by way of example and with reference to the accompanying drawings, in which.

DETAILED DESCRIPTION

Figure 1:
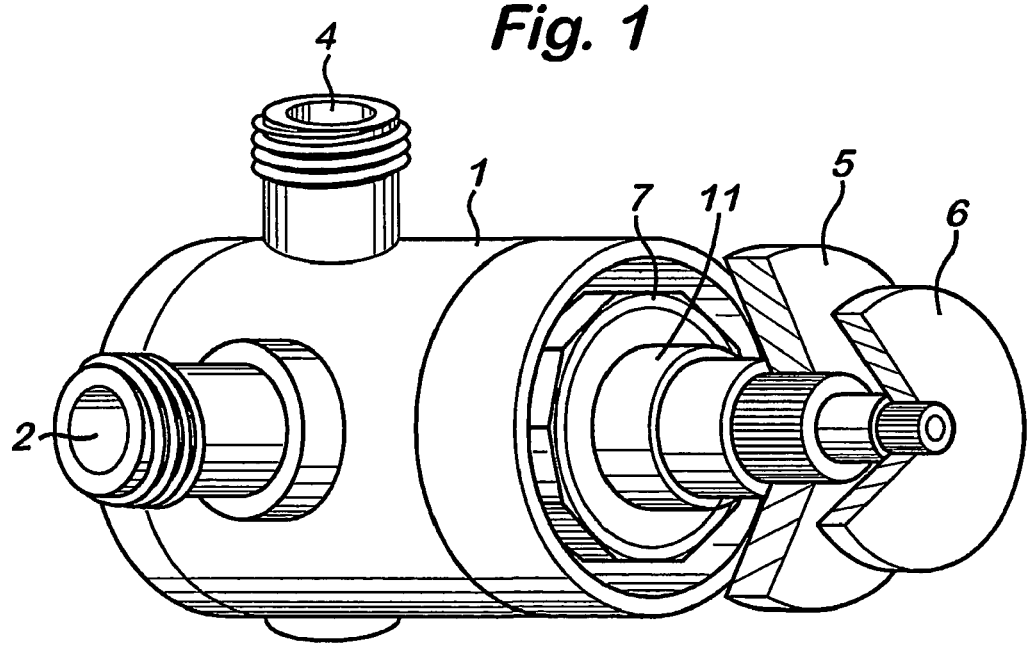
FIG. 1 is a perspective view of a mixer tap of the invention, with control knobs shown broken away.

Referring to the drawings, the mixer tap for a shower there shown has a body 1, with a cold water pipe connection 2, a hot water pipe connection 3 and a mixed water outlet connection 4. A flow control knob 5 and a water temperature control knob 6 are provided at the front of the tap.

At the heart of the tap is a flow mixer cartridge 11, which is sealed in a cavity 12 in the body via an outer collar 14. The collar has three sealing grooves 15,16,17 carrying O-rings 115,116,117. The front groove 15 is a plain circular groove and its O-ring mates with a circular-cylindrical land 215 at the front of the body cavity 12. Equally the rear groove 17 is also a plain circular groove of smaller diameter than the front groove 15 and its O-ring mates with a circular-cylindrical land 217 at the back of the body cavity 12. Between the lands, the cavity has a frusto-conical wall 216. The groove 16 and its O-ring 116 have a complementary, oblique shape.

Figure 2:
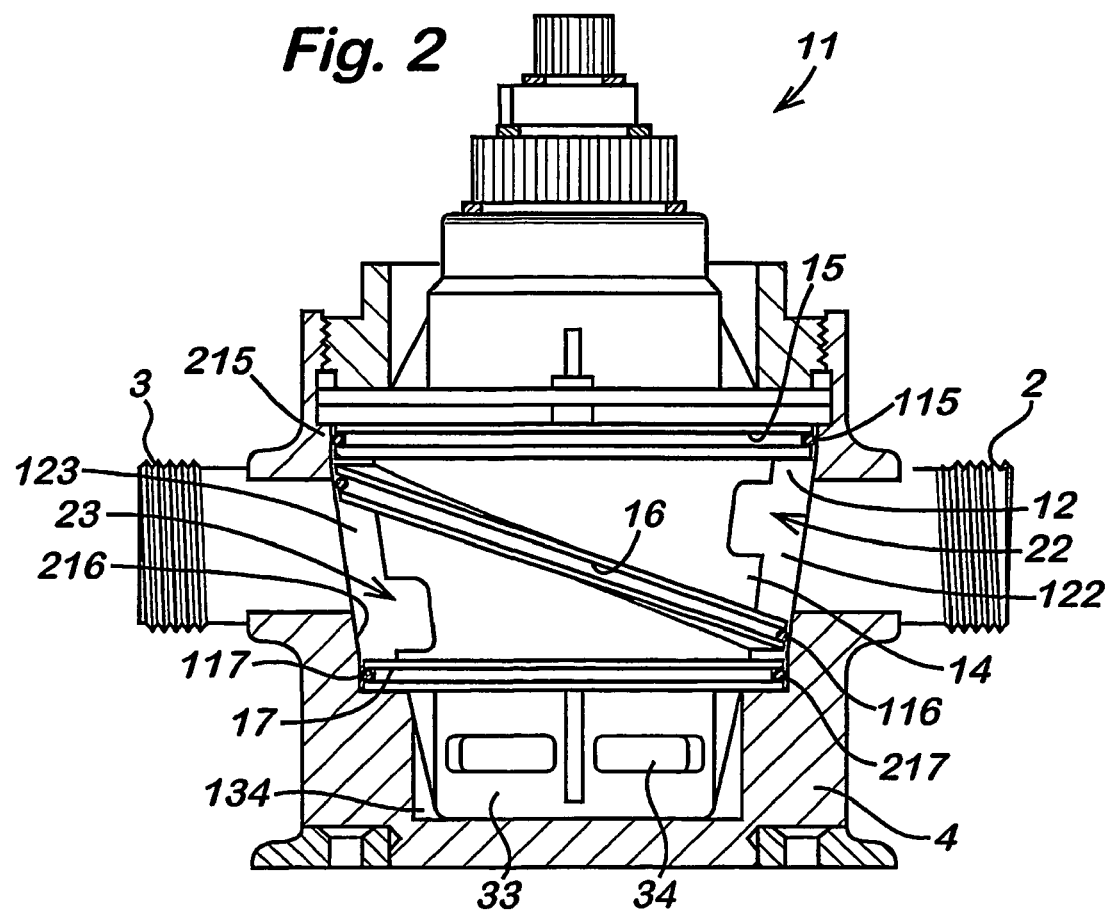
FIG. 2 is cross-sectional view through a body of the tap, showing its flow mixing cartridge.
Figure 3:
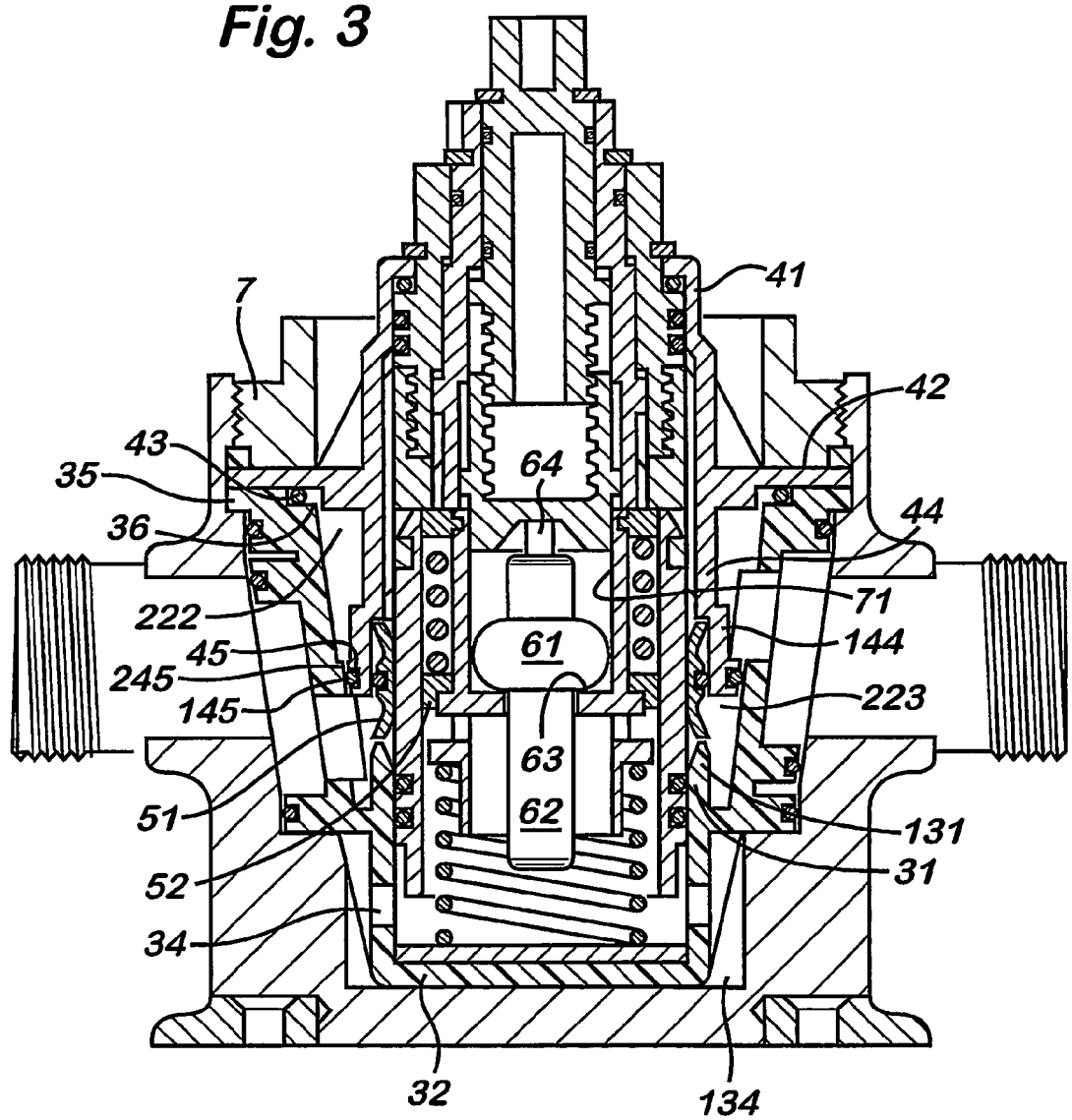
FIG. 3 is a similar view showing the cartridge in cross-section.
Figure 4:
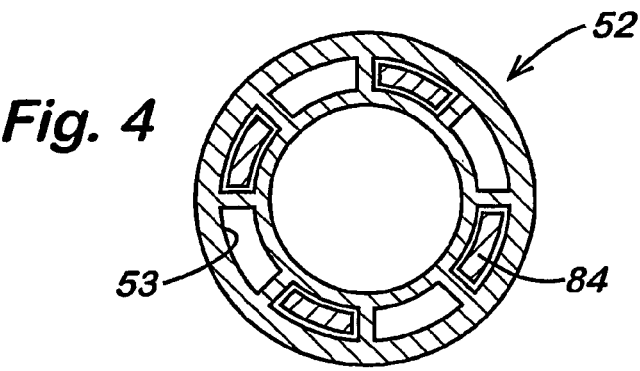
FIG. 4 is a scrap cross-sectional view in the other plane of a shuttle in the cartridge.

To one side, the right hand side in FIGS. 2 & 3, between the front groove 15 and the oblique groove 16, the collar has a cold water port 22; whilst to the other side between the back groove 17 and the oblique groove 16, the collar has a hot water port 23. These ports are in communication with the cold and hot water connections 2,3 in the body, via inlet plena portions 122,123 of the cavity between the body and the collar. The connections are able to be axially aligned with each other, since the ports 22,23 are offset and isolated from each other by the oblique seal. Thus with the body forged from brass, the inlet pipe connections can be formed by straight forward machining operations.

The collar 14 is an injection moulding of plastics material and is integrally moulded with an rear barrel portion 31, the collar being generally frusto-conical to match the shape of the body cavity; whilst the barrel portion is parallel with an end face 131. The collar moulding has a closed end 32, closing both the collar and the barrel. In an extension 33 of the barrel beyond the collar, there is an outlet port 34. This opens to a rear outlet plenum portion 134 of the cavity, from which latter in turn the outlet connection 4 extends.

Figure 5:
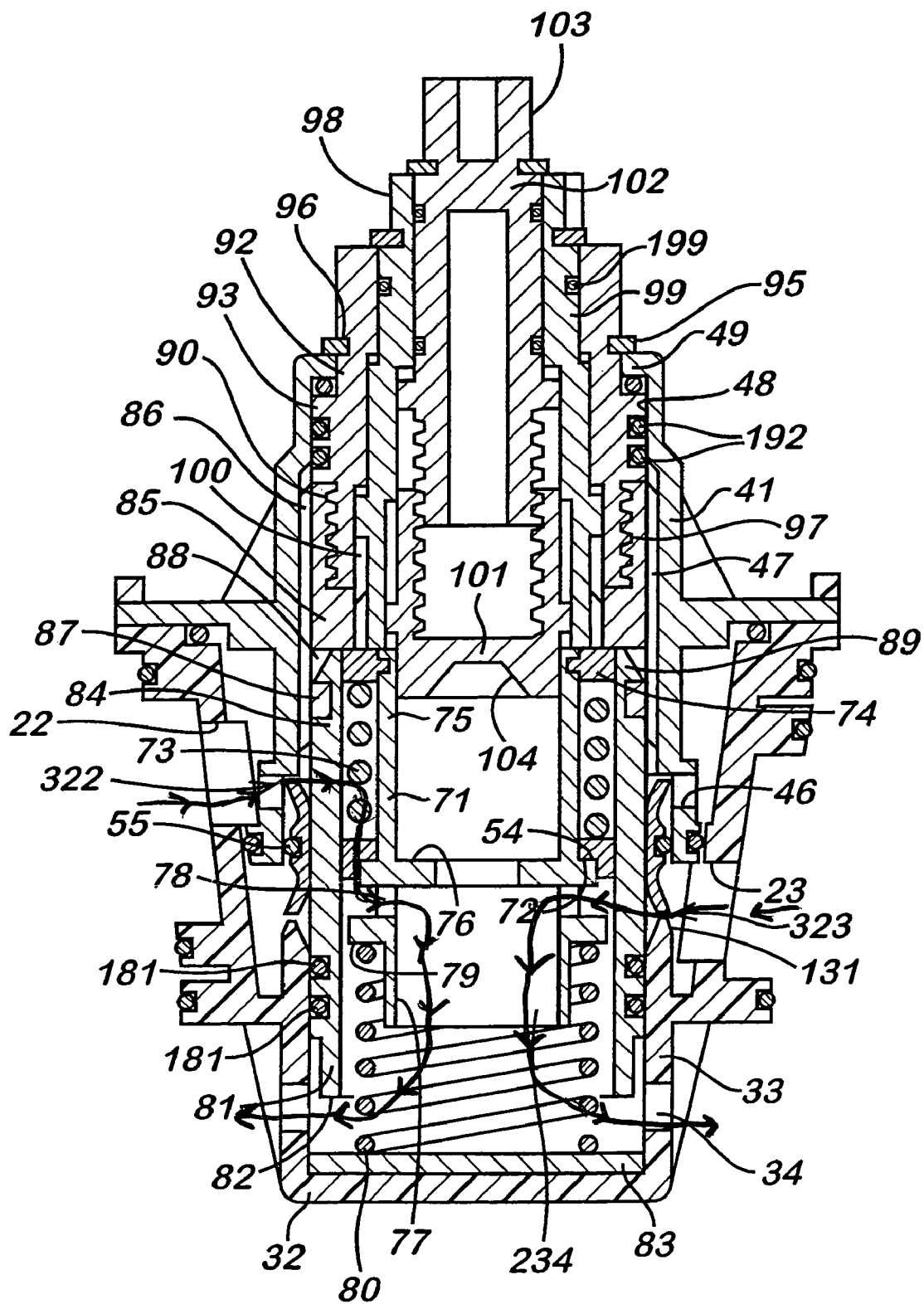
FIG. 5 is a cross-section view of the cartridge on a larger scale than FIG. 3.

A front barrel moulding 41 is fitted to the rear-barrel collar moulding 14/31, mating with it at a flange 35, adjoining the sealing groove 15, and at an inner sealing land 36. A flange 42 of the front barrel moulding abuts the flange 35 and the two are held together by a threaded ring 7 in the body 1 at the mouth of the cavity 12. An O-ring 43 is captive between the flanges and seals them. The flange 42 extends in to support the front barrel proper 44, whose internal diameter is slightly larger that of the rear barrel and which has a rear end face 144 opposite the front end face 131 of the rear barrel. The rim flange 51 of a shuttle 52 is positioned between the faces 131,144, with a small clearance. The front barrel extends back as a sealing groove 45 past the end face 144 and is provided with an O-ring 145, which seals on a land 245 of the collar 14, the land forming an intermediate portion of the barrel. The seal 45/145/245 divides the internal space of the collar into inner, cold and hot, plena portions 222,223. These are in communication with the respective small clearance cold and hot gaps 322,323 between the barrel end face 144 and the shuttle and the barrel end face 131 and the shuttle. The connection between the front barrel 44 and the sealing groove 45 is apertured 46. Thus water can flow from the cold and hot plena portions 222,223 via the cold and hot gaps 322,323 into the barrels 44,31 in accordance with position of the shuttle. In other words, the cold and hot gaps 322,323 provide hot and cold inlets into the combined barrel. This water flow path into the combined barrel is illustrated in FIG. 5 by the inward pointing arrows 322 for cold water flow, and 323 for hot water flow.

The shuttle itself is apertured 53, so that flow can pass it from the front barrel 44 to the rear barrel 31 and onto the outlet port 34. The shuttle is fitted to a thermostatic capsule 61, which has an expansive wax chamber 62, a support flange 63 and an actuating push rod 64, which is pushed out of the capsule in response to the wax chamber experiencing increased temperature. This action adjusts the cold and hot gaps 322,323. Since it is possible for a sudden increase in temperature, as in first use of a shower when hot water first arrives, to extend the push rod by more than the aggregate of the gaps, the connection between the shuttle and the capsule is via a spring reactor 71. It and the shuttle have complementary abutments 54,72, which are arranged to allow the capsule to move back in the cartridge on such over temperature causing the shuttle to bottom on the rear barrel end face 131. This movement apart of the abutments is against the action of a spring 73 acting between the abutment 54 and a clip 74 on a forwards extension 75 of the reactor. The spring normally keeps the abutments 54,72 together, whereby the movement of the support flange 63 of the capsule is transmitted to the shuttle via a seat 76 for the support flange. The spring reactor 71 also has a rearwards extension 77, which is apertured 78 for water flow to the wax chamber 62, with a flange 79 for a main spring 80 against which the capsule normally acts for adjustment of the position of the shuttle. The spring reacts against a sealing washer 83 and the closed end 32 of the collar moulding.

A flow controller 81 is provided within the rear barrel. It is in the form of a sleeve carrying two O-rings 181 for sealing with the rear barrel and having an end face 82 for abutment with the sealing washer 83 carried inside the closed end 32 of the collar moulding. The sleeve has integral fingers 84, which extend forwards through certain of the apertures 53 in the shuttle. Rearwards movement of the flow controller throttles and ultimately closes the tap by isolating the inner, outlet plenum portion 234 of the cartridge, in which the wax chamber 62 is positioned, from the outer, plenum portion 134 of the cavity 14. More specifically, the sleeve end face 82 abuts the sealing washer 83 and isolates the outlet port 34 from the inlet ports 22,23.

The arrangements for longitudinal actuation of the flow control sleeve 81 and the capsule/shuttle 61/52 will now be described. Essentially, they comprise splined members driven longitudinally by screw thread co-operation with rotary members restrained from longitudinal movement.

The front barrel moulding 41 has internal splines 47, open towards the rear and terminating short of a smaller diameter plain bore 48 and a turned-in, front rim 49 of the moulding. An actuating sleeve 85 has complementary outer splines 86 for sliding movement in the barrel without rotation. It has a skirt 87 with apertures 88 in which hooks 89 at the end of the fingers 84 engage. The sleeve 85 has an internal screw thread 90 and internal splines 91 proud of the thread at the inner end of the sleeve.

An actuation threaded member 92 is provided at the front of the barrel moulding, being longitudinally restrained in it by abutment of a step 93 against the inside of the rim 49 and of a circlip 95 against the outside of the rim, the circlip being engaged in a groove 96 in the actuation member 92. A pair of O-rings 192 engage in grooves in the member and seal it to the barrel at the bore 48. The member has an external screw thread 97 at its inner end, engaged in the thread 90 of the sleeve 85, and a broached outer head 98 engaged in the flow control knob 5. Thus the threaded member is rotatable but axially restrained; whilst the sleeve is rotationally restrained but axially movable. On turning of the knob 5, the actuating sleeve 85 is moved axially and with it the sleeve 81, moving its end face 82 towards or away from the sealing washer 83. Thus the overall flow through the tap is controlled.

Housed within the flow control actuation threaded member 92 is a spacer sleeve 99, with a step and circlip axial restraint similar to that of the threaded member. It has external splines 100 engaged with the splines 91 of the actuating sleeve 85. Thus sleeve is restrained against axial and longitudinal movement. It is also sealed by an O-ring 199 to the member 92. Mounted within the sleeve 99 in exactly like manner to the members 85, 92 are a thermostat actuating member 101 and a thermostat actuation threaded member 102 with a broached head 103 to which the water temperature control knob 6 is fitted. The actuating member 101 has an indented inner end 104 against which the push rod 64 of the thermostatic capsule abuts. Rotation of the temperature control knob 6 moves the shuttle 52 under the action of the reaction spring 73 or the main spring 80 to close the respective gap 322,323 to raise or lower the outlet water temperature as the temperature changes. After initial shuttle movement, the capsule will change length to adjust the shuttle back in the opposite direction and thus control the temperature to the newly selected one.

It will be appreciated from the fact that the cartridge is shown in FIG. 5 reversed right for left in comparison with FIG. 3, that it can be fitted in either orientation to suit left or right entry of cold—and hot—water into the body of the tap. This is a distinct advantage in that it is not unknown for plumbers to reverse the plumbing accidentally.

Figure 6:
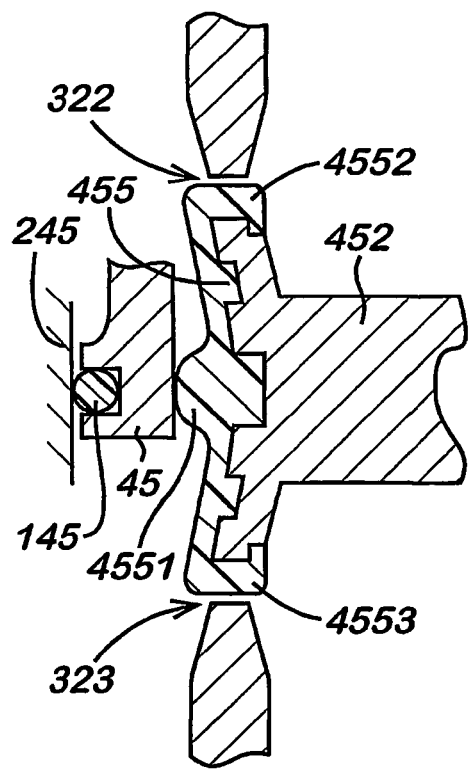
FIG. 6 is a scrap view of a modified shuttle with a shut-off seal.

Referring now to FIG. 6, a scrap view of a modified shuttle is there shown. In place of an O-ring 55 carried on the rim of the shuttle and acting inside the grooved portion 45 of the front barrel, to separate the cold and hot plena 222,223, the shuttle 452 has an over-moulding 455 of elastomeric material. This has a sealing protrusion 4551 acting in the manner of the O-ring and annular portions 4552,4553 at the cold and hot gaps 322,323. This has the advantage that in the event of failure of either hot or cold water supply, the thermostatic capsule drives the shuttle in the direction to fully open the failed supply and fully close the remaining supply. This has the effect of turning off the tap. Provision of the moulding at the gaps enables the shuttle to fully seal the gap corresponding to the remaining supply.

The invention is not intended to be restricted to the details of the above described embodiment. For instance, it can be envisaged that the oblique seal could be configured as a front to back seal in the vertical plane. However, the O-ring would have to be replaced in that instance.

Figure 7:
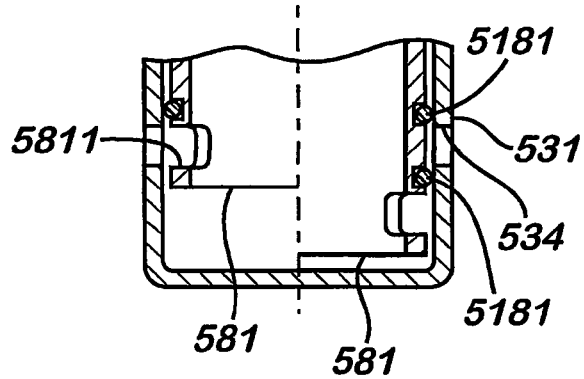
FIG. 7 is a scrap cross-sectional view of the outlet of the mixer tap with an alternative flow controller, shown open in the left half of the Figure and closed in the right half of the Figure.

The flow controller can be provided as an apertured cylinder 581 co-operating with the rear barrel portion 531 as shown in FIG. 7. Barrel apertures 534 align with apertures 5811 in the cylinder when the mixer tap is open and are out of alignment to close the tap. When the tap is closed two O-rings on the cylinder are positioned above and below the barrel apertures, sealing them.

Figure 8:
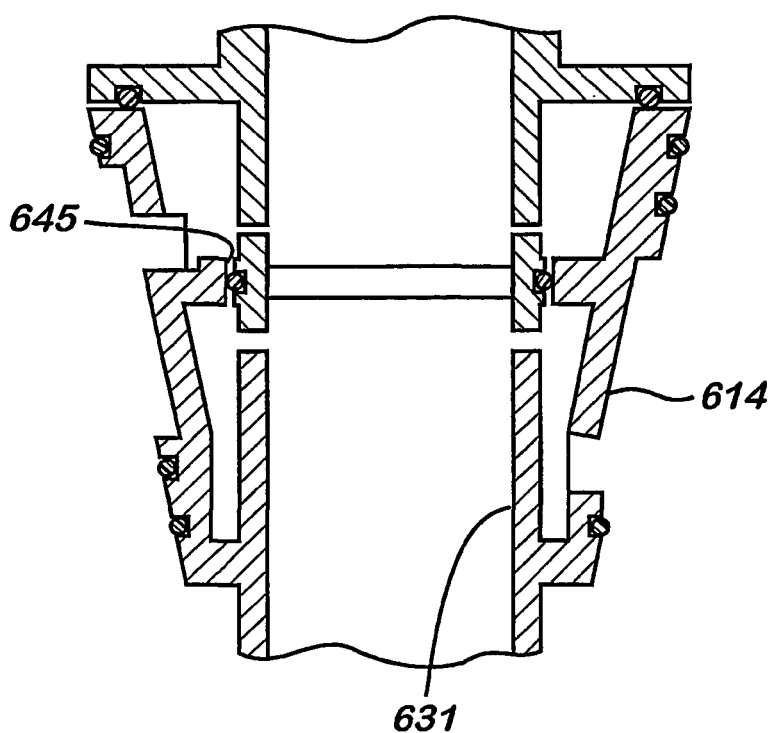
FIG. 8 is similar view of an alternative unitary collar (with other components except for the shuttle omitted)

As shown in FIG. 8, the rear barrel portion 631 can be formed as one, or integrally welded together, not only with the collar 614, but also with the land 645 to dispense with the necessity of seal 145.

Figure 9:
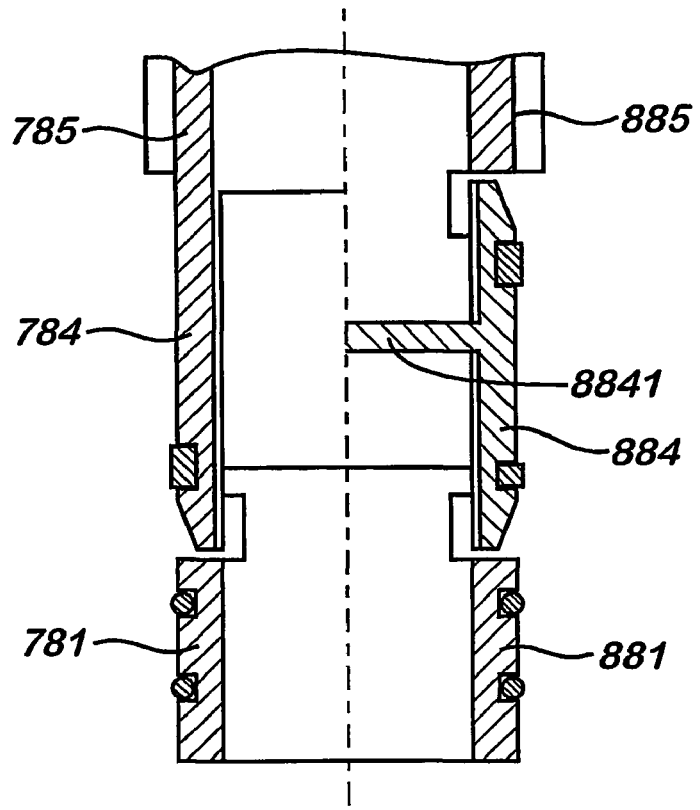
FIG. 9 is a similar view of two alternative actuating finger arrangements, in the respective left and right halves of the Figure.

As shown in the left hand side of FIG. 9, the actuating fingers 784 can be integral with the actuating sleeve 785 and clipped to the flow control member 781. Alternatively as shown in right hand side of the Figure fingers 884 can be clipped to both the actuating sleeve 885 and the flow control member 881, with the fingers being spaced circumferentially by means of an integral ring 8841.

Figure 10:
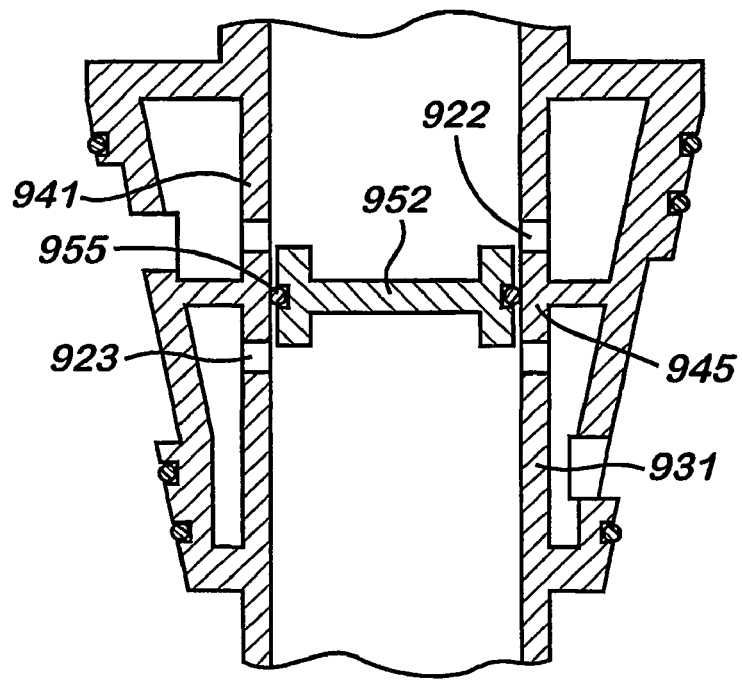
FIG. 10 is a view similar to FIG. 8 of an alternative barrel and shuttle configuration.

Another alternative arrangement is shown in FIG. 10, in which the two aligned barrel portions 931,941 and the intermediate portion 945 of the barrel are all integral parts of unitary construction. The barrel has cold and hot inlets 922,923 in the form of apertures in the walls of the barrel between the front portion and the intermediate portion and between the intermediate portion and the rear portion. The shuttle 952 is contained within the barrel has an O-ring 955 sealing it to the intermediate portion. It moves to seal either the sets of ports as required.

The invention claimed is:

1. A cartridge for a flow mixer comprising:
   a barrel having:
      an outlet at one end of said barrel,
      two aligned barrel portions and
      a intermediate barrel portion and
      said barrel portions providing:
      two respective liquid inlets spaced along said barrel, one to one side of said intermediate barrel portion and said other to said other side thereof, and
   a shuttle mounted in said barrel in sealing relationship with said intermediate barrel portion and axially movable in said barrel, said shuttle and said barrel being adapted and arranged to:
      close one of said inlets by co-operation with said inlet's respective barrel portion and said intermediate barrel portion when moved towards this barrel portion;
      close said other inlet by co-operation with its respective barrel portion and said intermediate portion when moved in the other direction and
      allow both inlets to be open in a mid position, and said shuttle being apertured for flow therethrough,
   a thermostatic capsule arranged within said barrel in the flow of liquid through said inlets and adapted to control the position of said shuttle for selection of flow from the two inlets,
   a combined-flow control member ("flow controller") arranged downstream of said thermostatic capsule at the outlet end of the barrel for controlling the combined flow from the inlets and
   means including at least one finger passing through said shuttle for longitudinal actuation of the flow controller to control the combined flow.

2. A cartridge as claimed in claim 1, wherein said flow controller is a sleeve mounted in said barrel and sealing in its closed position against a closed end of said barrel, thereby closing an outlet aperture in said wall of said barrel adjacent its end.

3. A cartridge as claimed in claim 2, wherein said flow control sleeve seals against a seal captivated between said sleeve and the end of said barrel.

4. A cartridge as claimed in claim 1, wherein said flow controller is a movable obturator closing an open end of said barrel forming the outlet.

5. A cartridge as claimed in claim 1, wherein said flow controller is an apertured cylinder closing one or more outlet apertures in said barrel at said outlet end with said end being closed.

6. A cartridge as claimed claim 1, wherein:
said two aligned barrel portions are distinct parts which are sealed together, with said intermediate barrel portion being integrally connected to one of said two barrel portions; and
said shuttle is positioned and acts between opposed ends of said two portions.

7. A cartridge as claimed in claim 1, wherein:
the two aligned portions and said intermediate portion of said barrel are all integral parts of unitary construction, said inlets are apertures in the aligned portions and
said shuttle is contained completely within said barrel.

8. A cartridge as claimed claim 1, wherein said actuating means for said flow controller is an integral part of said flow controller.

9. A cartridge as claimed in claim 7, wherein said actuating means comprises one or more fingers integrally moulded with said flow controller and engaging an actuator at the opposite side of said shuttle from said flow controller and said thermostatic capsule.

10. A cartridge as claimed in claim 7, wherein said actuating fingers have clip formations clipped to said actuator.

11. A cartridge as claimed in claim 1, wherein said actuating means comprises one or more fingers extending integrally extending from said actuator and engaging said flow controller.

12. A cartridge as claimed in claim 1, wherein said actuating means is separately formed and is engaged with both said flow controller and said actuator.

13. A cartridge as claimed in claim 1, wherein said actuator comprises a sleeve irrotationally held in said barrel and a rotary member carried by said barrel, said sleeve and said rotary member being adapted to convert rotation of said rotary member into translation of said actuator and said flow controller.

14. A cartridge as claimed in claim 13, wherein said rotary member is sealed to said barrel and said rotary member extends inside said actuator.

15. A cartridge as claimed in claim 14, including means for adjusting said thermostatic capsule comprising a second sleeve irrotationally held in said actuator sleeve, a second rotary member carried by said second sleeve and a capsule actuator irrotationally held in said actuator sleeve and threadedly engaged with said second rotary member.

16. A cartridge as claimed in claim 1, wherein said barrel, said shuttle, said flow controller and said actuating means are of plastics material.

17. A cartridge as claimed in claim 1, wherein said shuttle has an O-ring carried on a rim of said shuttle and acting with said intermediate barrel portion to provide the seal between said shuttle and said intermediate barrel portion.

18. A cartridge as claimed in claim 1, wherein said shuttle has an over-moulding of elastomeric material on a rim of said shuttle, the over-moulding having a sealing protrusion acting with said intermediate barrel portion to provide the seal between said shuttle and said intermediate barrel portion and/or annular portions at sealing faces adapted to co-operate with the aligned barrel portions to close the respective inlets.

19. A cartridge as claimed in claim 1, including three outer seals encircling the axis of said barrel for sealing to an outer body, the seals comprising:
a back seal for sealing the outlet of said barrel from the inlet closer to the outlet;
a front seal for sealing the inlet further from the outlet from leaking to ambient; and
an oblique seal for sealing the inlet closer to the outlet from the inlet further from the outlet, the oblique seal being spaced further from the back seal to one side of the barrel and spaced further from the front seal to the other side of the barrel.

20. A cartridge as claimed in claim 19, wherein the seals are arranged to seal with a conical bore.

21. A cartridge as claimed in claim 19, wherein the seals are O-rings carried in respective grooves on the outer surface of the cartridge.

22. A cartridge as claimed in claim 19, wherein said barrel has an outer collar integrally connected with said aligned barrel portion having said outlet, said collar having:
a first inlet between said back seal and said oblique seal to one side of said barrel and
a second inlet between said front seal and said oblique seal to the other side of said barrel, and
said first and second collar inlets communicating with said barrels inlets.

23. A cartridge as claimed in claim 22, wherein said collar inlets communicate with said barrel inlets via plenum chambers extending around said barrel.

24. A cartridge for a flow mixer comprising:
a barrel having:
an outlet at one end of the barrel,
two aligned barrel portions and
a intermediate barrel portion and
the barrel portions providing:
two respective liquid inlets spaced along the barrel, one to one side of the intermediate barrel portion and the other to the other side thereof, and
a shuttle mounted in the barrel in sealing relationship with the intermediate barrel portion and axially movable in the barrel, the shuttle and the barrel being adapted and arranged to:
close one of the inlets by co-operation with the inlet's respective barrel portion and the intermediate barrel portion when moved towards this barrel portion;
close the other inlet by co-operation with its respective barrel portion and the intermediate portion when moved in the other direction and
allow to be open in a mid position, and
the shuttle being apertured for flow therethrough,
a thermostatic capsule arranged within the barrel in the flow of liquid through the inlets and adapted to control the position of the shuttle for selection of flow from the two inlets,
a combined-flow control member ("flow controller") arranged downstream of the thermostatic capsule at the outlet end of the barrel for controlling the combined flow from the inlets and three outer seals encircling the axis of the barrel for sealing to an outer body, the seals comprising:

a back seal for sealing the outlet of the barrel from the inlet closer to the outlet;

a front seal for sealing the inlet further from the outlet from leaking to ambient; and an oblique seal for sealing the inlet closer to the outlet from the inlet further from the outlet, the oblique seal being spaced further from the back seal to one side of the barrel and spaced further from the front seal to the other side of the barrel.

25. A cartridge as claimed in claim 24, wherein said seals are arranged to seal with a conical bore.

26. A cartridge as claimed in claim 24, wherein said seals are O-rings carried in respective grooves on said outer surface of said cartridge.

27. A cartridge as claimed in claim 24, wherein said barrel has an outer collar integrally connected with said aligned barrel portion having said outlet, said collar having:

a first inlet between said back seal and said oblique seal to one side of said barrel and a second inlet between said front seal and said oblique seal to the other side of said barrel, and said first and second collar inlets communicating with said barrels inlets.

28. A cartridge as claimed in claim 27, wherein said collar inlets communicate with said barrel inlets via plenum chambers extending around said barrel.

29. A cartridge as claimed in claim 24, including:

means including at least one finger passing through said shuttle for actuating said flow controller to control said combined flow.

30. A mixer tap for mixing two liquid flows, the tap comprising:

an outer body, having a central cavity with
an open front,
a rear outlet from the central cavity and
two opposed inlets from the sides of the body, the inlets in the body being at least substantially coaxial and the cavity being adapted for sealing; and a cartridge as claimed in claim 1, the cartridge sealing with the body via the outer collar:
firstly at the open front of the central cavity,
secondly obliquely in the cavity to direct flow from one body inlet to one cartridge inlet and flow from the other body inlet to the other cartridge inlet,
thirdly at the rear of the body to direct flow from the cartridge outlet to the body rear.

31. A mixer tap as darned in claim 30, wherein said outer body is of forged brass.

32. A mixer tap as claimed in claim 30, wherein said cavity is tapered with a larger diameter parallel land at said open front for said first seal, a frusto-conical, intermediate portion for said second, oblique seal and a smaller parallel land for said third seal adjacent said rear outlet, said seals being O-rings carried on said outer collar.

33. A shuttle for a flow mixer cartridge, said shuttle comprising a rim with two annular end faces for sealing with respective aligned barrel portions of said cartridge, said annular end faces being provided with an over-moulding of elastomeric material for sealing engagement with said respective aligned barrel portions.

34. A shuttle as claimed in claim 33, wherein said rim has a groove for an O-ring arranged to seal to an intermediate barrel portion of said cartridge.

35. A shuttle as claimed in claim 34, wherein said over-moulding has a sealing protrusion arranged to seal to an intermediate barrel portion of said cartridge.

* * * * *